United States Patent
He et al.

(10) Patent No.: US 11,544,961 B2
(45) Date of Patent: Jan. 3, 2023

(54) PASSIVE THREE-DIMENSIONAL FACE IMAGING BASED ON MACRO-STRUCTURE AND MICRO-STRUCTURE IMAGE SIZING

(71) Applicant: SHENZHEN GOODIX TECHNOLOGY CO., LTD., Shenzhen (CN)

(72) Inventors: Yi He, San Diego, CA (US); Bo Pi, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 241 days.

(21) Appl. No.: 17/107,803

(22) Filed: Nov. 30, 2020

(65) Prior Publication Data
US 2022/0171958 A1 Jun. 2, 2022

(51) Int. Cl.
*G06V 40/16* (2022.01)
*H04L 9/32* (2006.01)

(52) U.S. Cl.
CPC .......... *G06V 40/162* (2022.01); *G06V 40/172* (2022.01); *H04L 9/3231* (2013.01)

(58) Field of Classification Search
CPC . H04L 63/0861; H04L 9/3231; G06V 40/162; G06V 40/172
See application file for complete search history.

(56) References Cited

U.S. PATENT DOCUMENTS

| 9,607,138 B1 * | 3/2017 | Baldwin | G06F 21/32 |
| 10,762,183 B1 * | 9/2020 | Charan | G06F 21/32 |
| 2011/0314530 A1 * | 12/2011 | Donaldson | H04L 9/3271 726/7 |

(Continued)

FOREIGN PATENT DOCUMENTS

CN 108293054 A * 7/2018 ............. G06Q 50/01

OTHER PUBLICATIONS

A Multi-Algorithmic Face Recognition System (Year: 2006).*

*Primary Examiner* — Nizar N Sivji
(74) *Attorney, Agent, or Firm* — Kilpatrick Townsend & Stockton LLP

(57) ABSTRACT

Techniques are described for passive three-dimensional (3D) face imaging based on macro-structure and micro-structure image sizing, such as for biometric facial recognition. A set of images of a user's face is processed to extract authentication deterministic macro-structure (DMAS) measurements. A database includes profile DMAS measurements, profile location definitions for deterministic micro-structure (DMIS) feature regions, and profile DMIS signatures computed for the DMIS feature regions. A first-level authentication determination can be based on comparing the authentication DMAS measurements with the profile DMAS measurements. Authentication DMIS signatures can be computed from sub-images obtained for the DMIS feature regions at the profile location definitions. A second-level authentication determination can be based on comparing the authentication DMIS signatures with the profile DMIS signatures. An authentication result can be output based on both the first-level authentication determination and the second-level authentication that indicates whether authentication of the user is granted or denied.

20 Claims, 10 Drawing Sheets

(56) References Cited

U.S. PATENT DOCUMENTS

| | | | |
|---|---|---|---|
| 2015/0186636 A1* | 7/2015 | Tharappel | G06F 21/32 726/8 |
| 2020/0186522 A1* | 6/2020 | Apturkar | H04L 67/30 |
| 2020/0293644 A1* | 9/2020 | Tussy | G06K 9/22 |
| 2021/0110015 A1* | 4/2021 | McCarty | G06K 9/00892 |

* cited by examiner

PASSIVE THREE-DIMENSIONAL FACE IMAGING BASED ON MACRO-STRUCTURE AND MICRO-STRUCTURE IMAGE SIZING

FIELD

The invention relates generally to optics integrated into personal electronic devices. More particularly, embodiments relate to passive three-dimensional face imaging based on macro-structure and micro-structure image sizing, such as for biometric facial recognition.

BACKGROUND

Many modern electronic devices, such as smart phones, tablets, and laptops, are equipped with biometric security access systems, such as face identification (ID), fingerprint sensors, and the like. For example, face ID may be used to unlock a smart phone, log in to applications and accounts, to authorize mobile payments, etc. Similar face ID techniques are integrated into other access-control devices, such as electronic locks and automated teller machines (ATMs). Effective implementation designs tend to balance various considerations. For example, it is typically desirable to provide rapid and accurate results to a user in a manner that avoids both false positives (which reduce the security of the implementation) and false negatives (which can be frustrating to authorized users).

Conventional face ID systems tend to include relatively rapid, but relatively insecure facial recognition approaches based on identification of a limited number of large-scale structures. Such approaches tend to be relatively easy to spoof, for example, by using a two-dimensional image of an authorized user's face, a three-dimensional wax or latex model of an authorized user's face, or the like. For example, conventional face ID implementations on smart phones are typically designed to minimize usage of battery resources, memory resources, processor resources, etc. Also, conventional face ID implementations on smart phones tend not to be overly concerned with advanced spoofing techniques, or the like; and they tend to err on the side of allowing more false positives than false negatives to avoid frustrating authorized users who are trying to quickly unlock their smart phones. However, for many smart phone and other applications, it can be desirable to provide a higher level of security (including additional protection against spoofing), without excessively impacting battery, memory, processor, and other resources.

BRIEF SUMMARY OF THE INVENTION

Embodiments provide passive three-dimensional (3D) face imaging based on macro-structure and micro-structure image sizing, such as for biometric facial recognition. For example, an imaging system (e.g., in a smart phone or other electronic device) can be used to capture a set of images of a user's face. The set of images can be processed to extract authentication deterministic macro-structure (DMAS) measurements, such as measurements of eyes, nose, ear, and other large-scale features that do not appreciably change relative shape, size, location, orientation, etc. over time. A registration profile can be retrieved from a face ID database, which includes profile DMAS measurements, profile location definitions for deterministic micro-structure (DMIS) feature regions, and profile DMIS signatures computed for the DMIS feature regions. A first-level authentication determination can be made based on comparing the authentication DMAS measurements with the profile DMAS measurements. Characteristic sub-images can be obtained for the DMIS feature regions based on the profile location definitions, and authentication DMIS signatures can be computed from the characteristic sub-images. A second-level authentication determination can be made based on comparing the authentication DMIS signatures with the profile DMIS signatures. An authentication result can be output based on both the first-level authentication determination and the second-level authentication that indicates whether authentication of the user is granted or denied.

According to one set of embodiments, a method is provided for authentication of a user based on passive face imaging. The method includes: capturing, by an imaging system, a set of images of a user's face; processing the set of images to extract authentication deterministic macro-structure (DMAS) measurements; generating a first-level authentication determination based on comparing the authentication DMAS measurements with profile DMAS measurements; obtaining one or more characteristic sub-images of one or more deterministic micro-structure (DMIS) feature regions based on profile location definitions for each of the one or more DMIS feature regions; computing one or more authentication DMIS signatures from the one or more characteristic sub-images; generating a second-level authentication determination based on comparing the authentication DMIS signatures with profile DMIS signatures computed for each of the one or more DMIS feature regions; and outputting an authentication result based on both the first-level authentication determination and the second-level authentication that indicates whether authentication of the user is granted or denied.

According to another set of embodiments, a system is provided for authentication of a user based on passive face imaging. The system includes: an imaging camera to capture a set of images of a user's face; a face identification database having, stored thereon, a registration profile comprising profile deterministic macro-structure (DMAS) measurements, profile location definitions for each of one or more deterministic micro-structure (DMIS) feature regions, and at least one profile DMIS signature computed for each of the one or more DMIS feature regions; and a control and processing module having one or more processors, and a memory having, stored thereon, a set of instructions. Executing the set of instructions causes the one or more processors, operating in a user authentication mode, to: process the set of images to extract authentication DMAS measurements; generate a first-level authentication determination based on comparing the authentication DMAS measurements with the profile DMAS measurements; obtain one or more characteristic sub-images of the one or more DMIS feature regions based on the profile location definitions for each of the one or more DMIS feature regions; compute one or more authentication DMIS signatures from the one or more characteristic sub-images; generate a second-level authentication determination based on comparing the authentication DMIS signatures with the profile DMIS signatures; and output an authentication result based on both the first-level authentication determination and the second-level authentication that indicates whether authentication of the user is granted or denied. In some embodiments, executing the set of instructions causes the one or more processors further, operating in a registration mode, to: direct capturing, by the imaging camera, of a set of profile images of an authorized user's face; process the set of profile images to extract the profile DMAS measurements and to identify the one or more profile DMIS feature regions; for each profile DMIS feature region of the one or more profile DMIS feature regions: generate a respective profile location definition based on the profile DMAS measurements; obtain one or more respective characteristic profile sub-images from image data of the profile DMIS feature region; and compute one or more respective profile DMIS signatures from the one or more respective characteristic profile sub-images; and store, as a registration profile for the authorized user in the face identification database, at least some of the profile DMAS measurements, at least some of the respective profile location definitions for the profile DMIS feature regions, and at least some of the profile DMIS signatures computed for the profile DMIS feature regions.

According to another set of embodiments, a method is provided for registration of an authorized user to support subsequent face authentication based on passive face imaging. The method includes: capturing, by an imaging system, a set of images of an authorized user's face; processing the set of images to extract deterministic macro-structure (DMAS) measurements; storing at least some of the DMAS measurements as part of a registration profile in a face identification (ID) database; processing the images further to identify one or more deterministic micro-structure (DMIS) feature regions; and for each DMIS feature region of the one or more DMIS feature regions: generating a respective location definition based on the DMAS measurements; obtaining one or more respective characteristic sub-images from image data of the DMIS feature region; computing one or more respective DMIS signatures from the one or more respective characteristic sub-images; and storing, further as part of the registration profile in the face identification (ID) database, the respective location definition for the DMIS feature region, and at least one of the one or more respective DMIS signatures computed for the DMIS feature region.

BRIEF DESCRIPTION OF THE DRAWINGS

The accompanying drawings, referred to herein and constituting a part hereof, illustrate embodiments of the disclosure. The drawings together with the description serve to explain the principles of the invention.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION OF THE INVENTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Many modern electronic devices have integrated imaging systems that can be used for various features. For example, integrated imaging systems are ubiquitous in smartphones, automated teller machines, physical access control systems (e.g., electronic door locks), etc. In some cases, such imaging systems can provide user authentication features, such as for access control, biometric verification, and the like. Some imaging-based authentication features exploit face identification (face ID). For example, face identification can be used to provide depth and/or focusing information to the same and/or other imaging systems, to verify the authenticity or identification of a user, and/or for other purposes.

Figure 1:
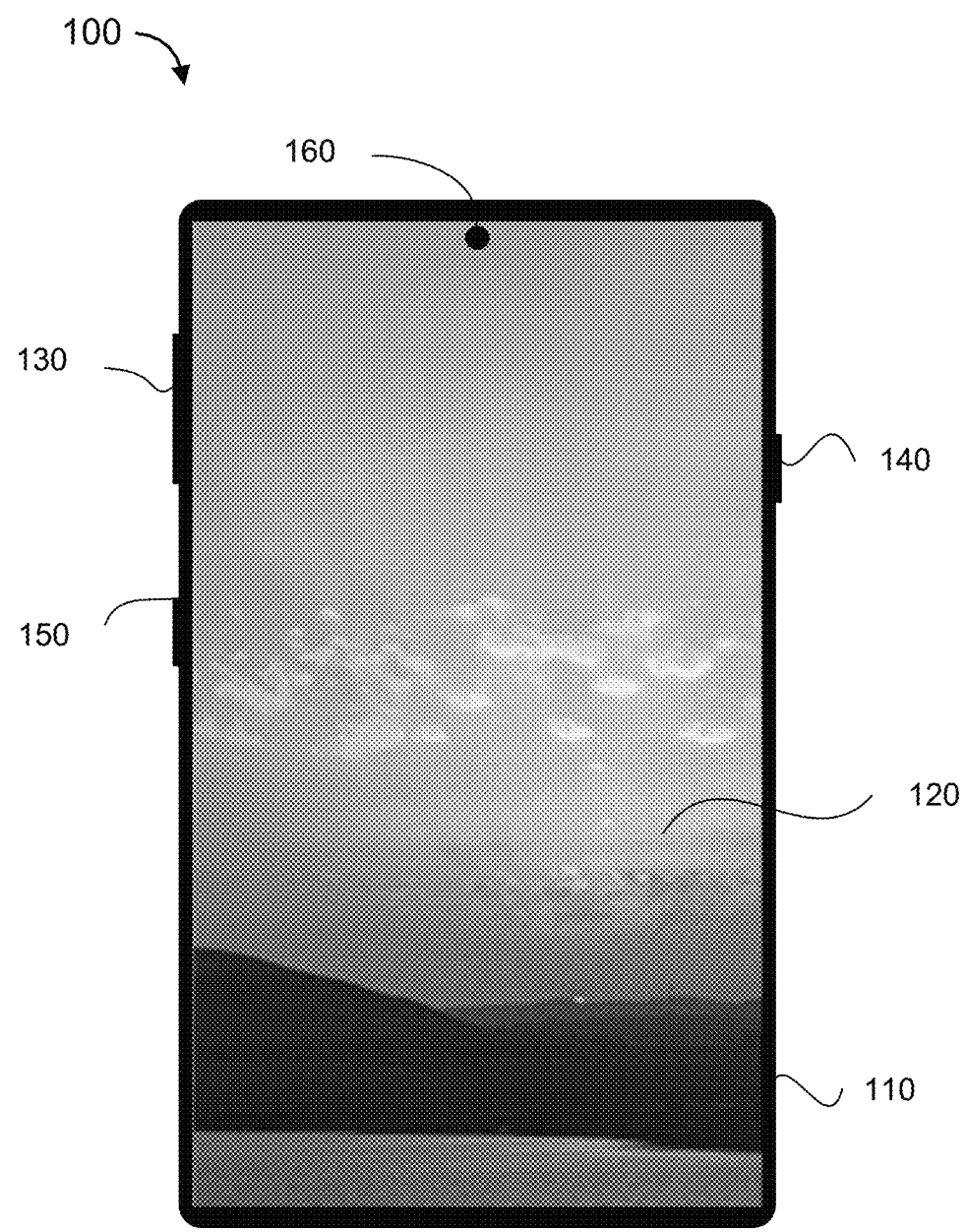
FIG. 1 illustrates a mobile device with an integrated imaging system.

For the sake of context, FIG. 1 illustrates a mobile device 100 with an integrated imaging system. The mobile device can be a smart phone, a tablet computer, a laptop computer, or the like, according to some embodiments. The mobile device 100 may include a display screen 120, a frame 110 surrounding the display screen 120, control buttons (e.g., a power button 140, audio volume control buttons 130, a holding force sensor 150, etc.), and/or any other components. The integrated imaging system can include one or more cameras 160, such as a front camera (e.g., a "selfie" camera), a rear camera, etc. In some implementations, the front camera 160 is also used for face ID sensing. In other implementations, a dedicated camera 160 is provided for face ID sensing.

Figure 2:
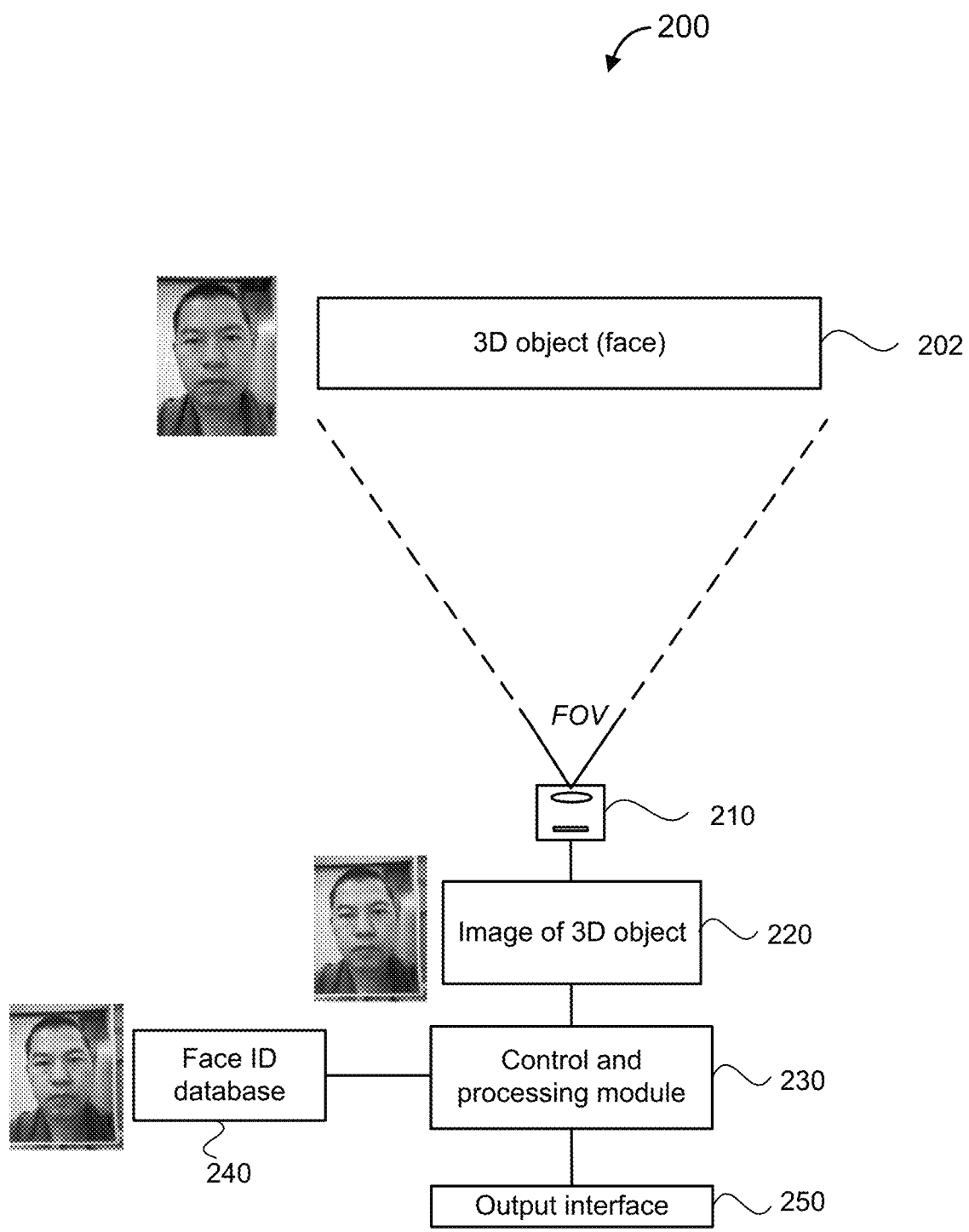
FIG. 2 illustrates a simplified block diagram of an electronic access control system using face ID sensing according to some embodiments.

FIG. 2 illustrates a simplified block diagram of an electronic access control system 200 using face ID sensing according to some embodiments. An imaging camera 210, such as the camera 160 of FIG. 1, can have an associated field of view (FOV) within which it can image a three-dimensional (3D) object 202. In the context described herein, it is generally assumed that the 3D object 202 is a human face, or is purported to be a human face. However, it will be appreciated that such descriptions should not be construed as limiting the invention to operate only in context of human faces and/or face ID sensing; rather, embodiments described herein can be applied to any suitable imaging context.

The camera 210 captures an image 220 of the 3D object 202 using imaging optics (e.g., lenses, mirrors, filters, etc.), sensors (e.g., photodetectors), and/or any suitable components. In some embodiments, capturing of the image 220 can involve focusing the imaging optics and/or tuning the sensors to form a clear image with desired sharpness, contrast, chromatic characteristics, etc. For example, the captured image 220 can have no or very small distortions or other types of image aberrations (e.g., spherical aberration, coma, astigmatism, and field curvature).

A control and processing module 230 may analyze the characteristics of the image 220. For example, the control and processing module 230 may be configured to identify that the image 220 contains an image of a human face, and can extract facial signatures of the human face from the image 220. The control and processing module 230 may be further configured to compare the facial signatures in the image 220 with facial signatures of an authorized user stored in a face ID database 240. The face ID database may include face ID data of the authorized user generated during a registration process. For example, during the registration process, one or more images of the live face of the authorized user may be captured by the camera 210. The images may be analyzed to extract (e.g., and characterize, etc.) the facial signatures of the authorized user. The facial images of the authorized user, as well as the facial signatures, may be stored in the face ID database 240 for subsequent security check.

The control and processing module 230 may determine whether the facial signatures in the ideal image 220 matches with a face ID data stored in the face ID database 240. The control and processing module 230 may output a facial recognition decision via an output interface 250. A processing unit of the mobile device 100 may grant or deny access, and/or provide other features, based on the facial recognition decision. For example, if the control and processing module 230 outputs a positive facial recognition decision indicating a match, the processing unit of the mobile device 100 of FIG. 1 may grant access to the mobile device 100 (e.g., waking up the mobile device 100), authorize a payment transaction using the mobile device, etc. On the other hand, if the control and processing module 230 outputs a negative facial recognition decision indicating a non-match, the processing unit of the mobile device 100 may deny access to the mobile device 100 (e.g., the mobile device 100 may remain locked).

In many practical contexts, such face ID sensing is designed to balance potentially competing considerations. For example, conventional approaches tend to analyze the captured image 220 only to a level at which to a relatively small number of characteristic points or measurements can be extracted from large-scale facial structures (e.g., corners of eyes). Those extracted points or measurements are then compared against previously registered points or measurements to determine whether a statistical match is apparent. Such an approach can be relatively fast and light-weight (e.g., using minimal computational, memory, battery, and/or other resources), but may also provide a relatively low level of security. For example, such an approach may yield a false-positive match for similar looking individuals and/or may be relatively simple to spoof using a high-resolution two-dimensional image of an authorized user's face, a three-dimensional wax or latex model of an authorized user's face, or the like. For many smartphone and other applications, it can be desirable to provide a higher level of security (including additional protection against spoofing), without excessively impacting battery, memory, processor, and other resources.

Figure 3:
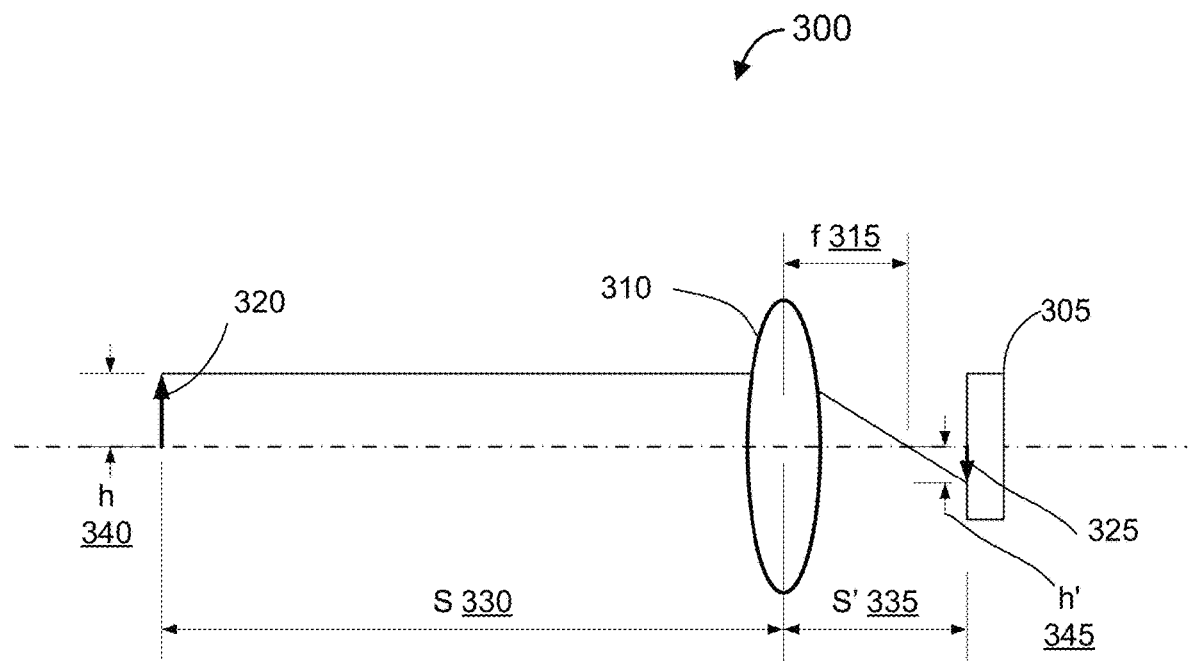
FIG. 3 shows an imaging environment to illustrate the optical principles involves in using image size to derive depth information from imaging, as a context for embodiments herein.

In general, embodiments described herein exploit various optical principles, including image size, to derive depth information from imaging. FIG. 3 shows an imaging environment 300 to illustrate the optical principles involves in using image size to derive depth information from imaging, as a context for embodiments herein. As illustrated, a lens 310 forms an image 325 of an object 320 on a photodetector 305 (e.g., a photodiode array). The lens 310 has a known focal length (f) 315, the photodetector 305 is a known imaging distance (S') 335 from the lens 310, and the object 320 has a known object dimension (h) 340. When the object 320 is a particular object distance (S) 330 from the photodetector 305, the image 325 will manifest a dimension (h') 345 corresponding to h 340; S 330 is a function of h' 345 in context of the known values off 315, S' 335, and h 340. As such, S 330 can be computed by measuring h' 345, as long as h' 345 can be mapped to a known h 340.

Figure 4:
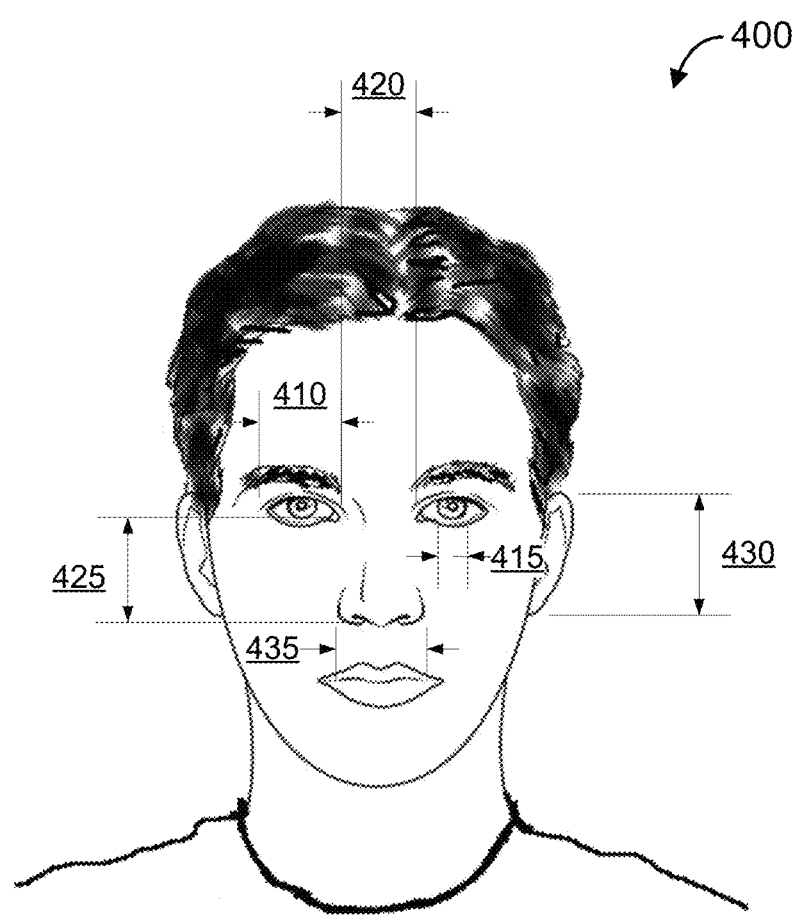
FIG. 4 shows an illustrative image of a face with various deterministic macro-structures.

In context of face ID sensing, a number of deterministic macro-structures (i.e., large scale structures) have been shown to provide measurements that are relatively characteristic of a particular individual and tend to remain consistent over time for that particular individual. FIG. 4 shows an illustrative image 400 of a face with various deterministic macro-structures. As illustrated, the deterministic macro-structures often correspond to sensing organs of the face, such as eyes, nose, and ears. For example, the illustrated image 400 indicates measurements of eye width 410 (e.g., between the outer corners of an eye), distance between eyes 420 (e.g., between the inner corners of the two eyes), iris diameter 415, distance from eye corner to bottom of nose 425, height of ears 430, width of nose 435, etc. Additional deterministic macro-structures can be used in some implementations, such as sizes of front teeth, nose length, etc. Once these measurements are obtained, they can be compared to previously obtained measurements for purportedly the same face to determine whether there is a match. For example, as described above in context of FIG. 2, corresponding deterministic macro-structure measurements are obtained during a registration process and recorded in a face ID database 240, and presently obtained deterministic macro-structure measurements are compared by the control and processing module 230 to determine whether there is a match. In some cases, the number of "profile" (i.e., pre-registered) deterministic macro-structure measurements may be different than the number of obtained deterministic macro-structure measurements. For example, during the registration process, a user may be prompted to turn the head slightly in different ways, change expressions, etc. to allow collection of a relatively large set of candidate deterministic macro-structure measurements. However, during subsequent imaging (e.g., for user authentication, or the like), it is expected that only a portion of those profile deterministic macro-structure measurements are obtainable by the imaging system (e.g., during imaging, the user's face is oriented so that certain features are hidden from the view of the imaging system, or the lighting is such that certain features are obscured, shadowed, etc.).

Some macro-structures tend not to be used in face ID sensing contexts because they are not sufficiently deterministic. For example, the mouth appreciably changes shape with changes in emotion and facial expression, such that the mouth tends not to provide deterministic macro-structure measurements. Similarly, eyebrows, forehead wrinkles, hairline, pupil diameter, and other large-scale structures of a face image are likely to change from one imaging session to another. Further, some deterministic macro-structures tend to be selected or excluded in face ID sensing contexts based on how easily or reliably they can be measured. For example, conventional face ID sensing techniques may not be able to reliably locate the tip of a nose because there may not be an easily identifiable feature in that location, or conventional face ID sensing techniques may not be able to reliably locate the tip of an earlobe because the earlobe may not reliably be in view of the imaging system.

Different implementations and implementation contexts can yield different approaches to obtaining deterministic macro-structure measurements. As a user turns or tilts her head relative to the imaging system, and/or changes her distance from the imaging system, certain measurements can change. Still, such effects on the measurements tend to be substantially deterministic. For example, when a head is turned, each eye is at a different distance from the imaging system and has a different 3D orientation with respect to the imaging system; but those eye-to-eye differences tend to follow predictable mathematical patterns. As such, rather than relying solely on the deterministic macro-structure measurements directly obtained from the image, embodiments can employ additional computations, normalizations, statistical processes, and/or other processes to account for these and other types of effects on those measurements. For example, in some implementations, deterministic macro-structure measurements include computationally derived measurements. For example, an implementation can measure the distance between the eyes 420 and the distance from an eye corner to the bottom of the nose 425, and can further compute a ratio of measurements 420 and 425 as a computationally derived measurement. In some embodiments, such computationally derived measurements are used as part of the set of deterministic macro-structure measurements. In other embodiments, such computationally derived measurements are used to correct the set of deterministic macro-structure measurements. For example, expected deterministic macro-structure measurements can be considered as lying in an expected measurement plane, and any changes to the orientation or location of the user's head effectively changes the orientation and location of the measurement plane to that of an imaged measurement plane (and correspondingly changes the positions and orientations of the obtained deterministic macro-structure measurements). The computationally derived measurements can be used to mathematically characterize the orientation and/or position of the imaged measurement plane, and to determine and apply a corresponding mathematical transform to reposition and reorient the obtained deterministic macro-structure measurements into the expected measurement plane.

As noted above, such deterministic macro-structure measurements only tend to yield a relatively small number of data points. While such an approach can be relatively fast and light-weight, it may be prone to outputting false-positive matches for similar looking individuals, or to spoof attacks using high-resolution two-dimensional images of an authorized user's face and/or using three-dimensional models of an authorized user's face. Embodiments described herein exploit such deterministic macro-structure measurements to facilitate obtaining deterministic micro-structure measurements. Such deterministic micro-structure measurements can be exceedingly difficult (e.g., practically impossible) to spoof.

Figure 5:
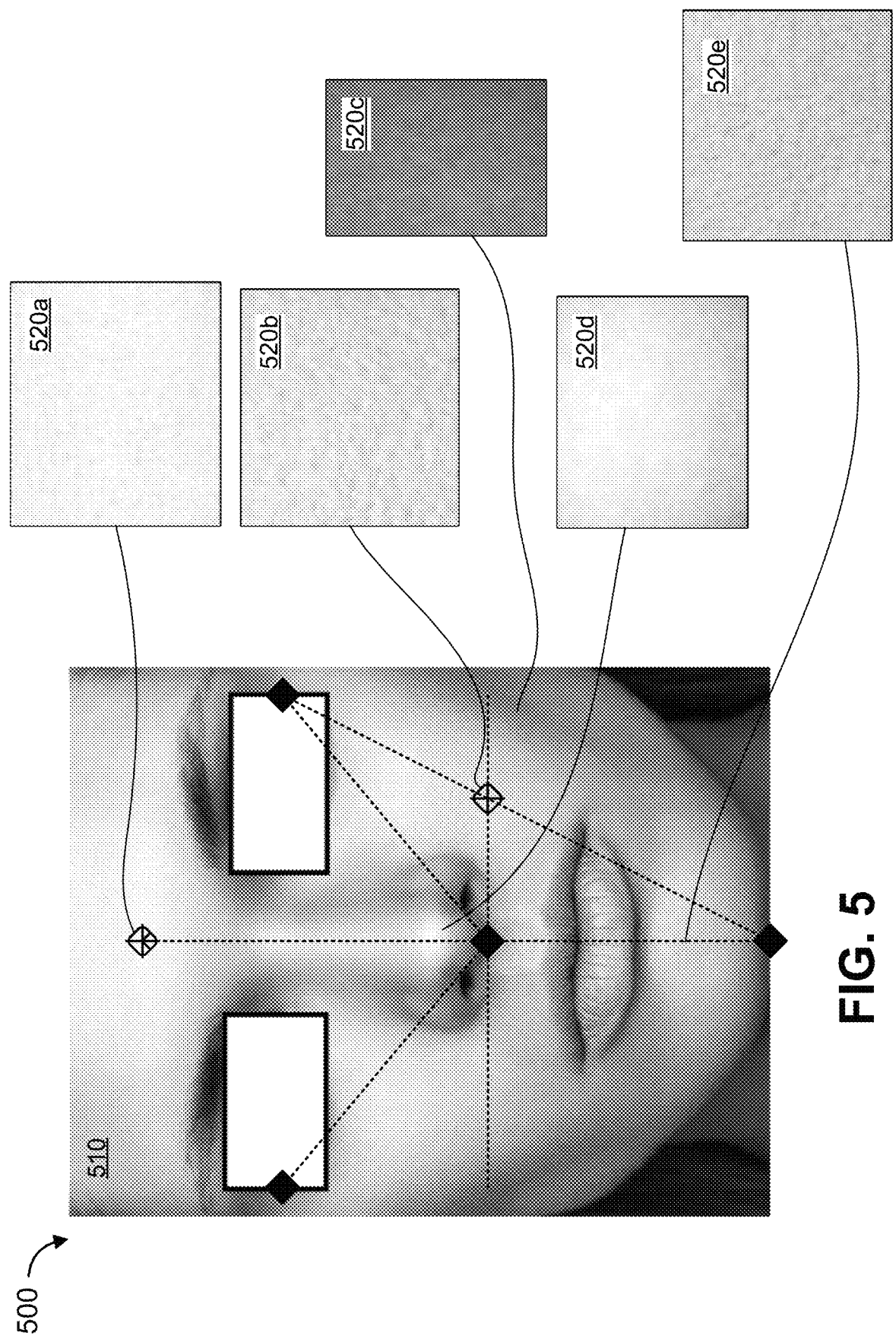
FIG. 5 shows an illustrative set of imaging data as a context for various embodiments described herein.

FIG. 5 shows an illustrative set of imaging data 500 as a context for various embodiments described herein. The illustrative set of imaging data 500 includes a high-definition image 510 of a portion of a human face, and multiple characteristic sub-images 520, each associated with a respective deterministic micro-structure feature region. The illustrative set of imaging data 500 is intended only to illustrate features of embodiments, and is not intended to limit the types of images described herein. For example, though the illustrative set of imaging data 500 includes processed output images from imaging systems, some embodiments described herein rely on imaging data that includes raw output data from image sensors (e.g., that has not been color-corrected, or otherwise processed).

The "object" (i.e., the imaged portion of the human face) shown in image 510 includes a number of different types of traceable structures. As described herein, embodiments can use these traceable structures to reliably locate deterministic micro-structure feature regions. In some embodiments, the traceable structures are the deterministic macro-structures, such as described in FIG. 4. For example, the traceable structures include eyes, ears, and nose. Such deterministic macro-structures can yield deterministically measurable feature locations, such as eye corners, eye width, nose width, etc. In some embodiments, the traceable structures can include additional macro-structures that are not necessarily deterministic, but may still be reliable locators for deterministic micro-structure feature regions. For example, the traceable structures in such embodiments can include eyebrows, eyelashes, eyelids, nostrils, lips, etc.

The deterministic micro-structures can be small-scale structures of the imaged object that are sufficiently consistent from one imaging session to another to be useful for face identification. Such deterministic micro-structures tend not to be easily seen or characterized without additional image processing. In some embodiments, such deterministic micro-structures are skin texture features, such as pore patterns. Notably, the deterministic micro-structures do not include non-deterministic features. For example, freckle patterns may tend to change over time with a person's recent sun exposure, or the like. In some implementations, the deterministic micro-structures can include other types of small-scale deterministic structures, such as iris vein patterns, or the like. However, some such micro-structures, even though deterministic, may still be prone to spoofing. For example, a high-resolution photograph may sufficiently capture vein patterns in a person's eyes to spoof an imaging system (e.g., as opposed to skin textures, which may not be captured by even the highest-resolution photographs). As such, some embodiments avoid using those types of deterministic micro-structures for face ID sensing, or only use those types of deterministic micro-structures along with other types of deterministic micro-structures that are less prone to spoofing.

The deterministic macro-structures can be used to locate deterministic micro-structure feature regions in any suitable manner. For example, as illustrated, the deterministic macro-structure measurements can be used to generate various grids, distances, angles, etc., from which to guide location of one or more deterministic micro-structure feature regions. As one example, a first deterministic micro-structure feature region is known to be located (e.g., based on prior registration) some vertical distance from the bottom of the nose. Upon imaging of the face, a vertical reference is computed as running from a center between the eyes to a center of the chin; and the first deterministic micro-structure feature regions can be found at the corresponding distance along that vertical reference from the bottom of the nose. As such, a first characteristic sub-image 520*a* can be derived to correspond to the first deterministic micro-structure feature region. As another example, a second deterministic micro-structure feature region is known to be located at a point on the cheek that corresponding to a particular intersection of reference lines and triangles. In particular, upon imaging the face, a triangle is located with vertices at the bottom center-point of the nose, the outer-right eye corner, and the center point of the chin; a horizontal reference line is located to pass through the of the bottom center-point of the nose and to run perpendicular to the vertical reference; and the location of the second deterministic micro-structure feature region is derived from the intersection of the horizontal reference with the hypotenuse of the triangle. As such, a second characteristic sub-image 520*b* can be derived to correspond to the second deterministic micro-structure feature region.

Figure 6:
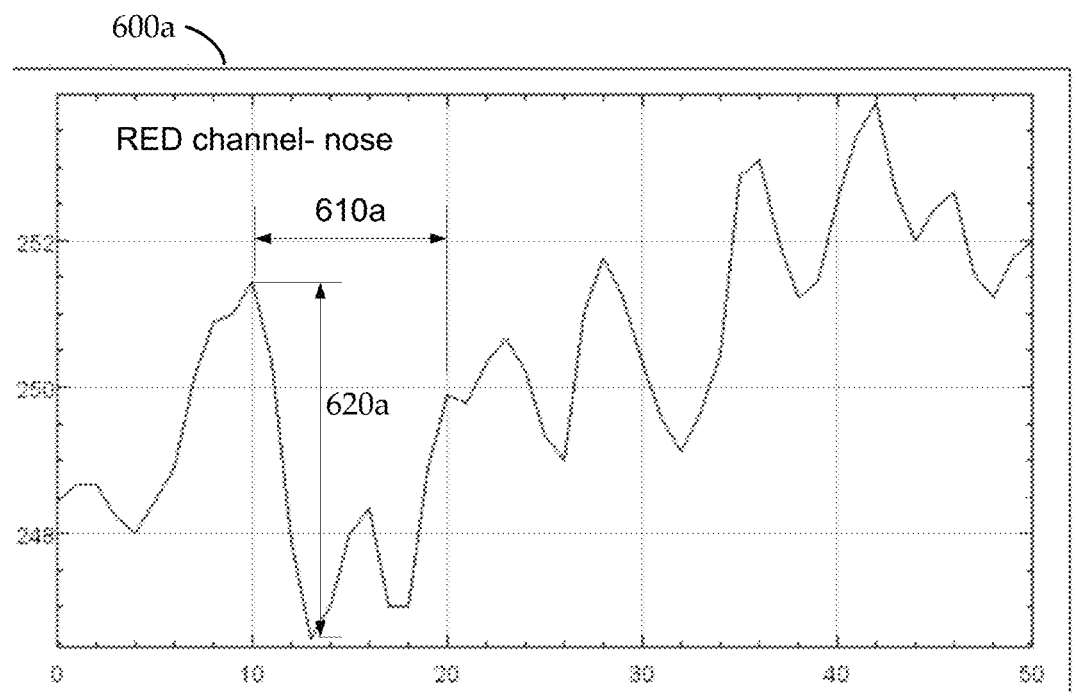
FIG. 6 shows illustrative partial chromatic responses for illustrative portions of two characteristic sub-images.
Figure 6:
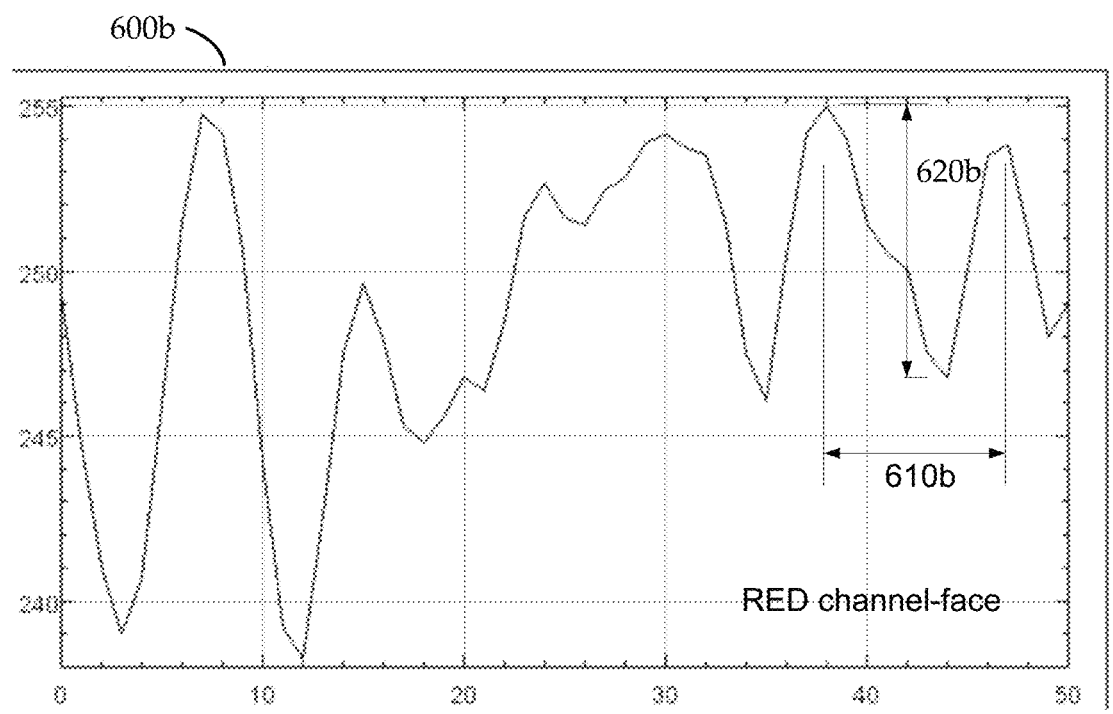

Having located the deterministic micro-structure feature regions, the corresponding characteristic sub-images 520 at those locations can be processed to derive deterministic micro-structure measurements. FIG. 6 shows illustrative partial chromatic responses 600 for illustrative portions of two characteristic sub-images. In particular, a first chromatic response 600*a* is derived from a portion of characteristic sub-image 520*d* of FIG. 5, which corresponds to a feature region around the tip of the nose; and a second chromatic response 600*b* is derived from a portion of characteristic sub-image 520*b* of FIG. 5, which corresponds to a feature region around the cheek. Each illustrated chromatic response 600 is an image brightness plot, shown as a plot of brightness value of the chromatic component (e.g., signal level of corresponding photodetector elements) versus location, over a fifty-pixel-long row of an image sensor array. For example, the imaging system is focused using a medium-wavelength chromatic component, such as using "green" chromatic responses, and the plotted value indicates the magnitude of response of a red photodiode component of each pixel of a photodiode array of the imaging system. Some embodiments described can operate regardless of which color component(s) are used for focusing, color correction, imaging, chromatic response plots, etc. For example, certain chromatic configuration options can tend to increase response magnitudes, improve contrast, and/or otherwise improve certain sensing parameters; but some embodiments may still operate reliably across a large range of such chromatic configuration options.

Multiple types of information can be obtained from the chromatic responses 600. To obtain such information, implementations can compute statistics to measure the distribution of brightness slopes, standard deviations of brightness valley depths, profile valley widths, and/or other values. For example, an illustrative brightness valley depths 620 and an illustrative profile valley width 610 are shown in each plot 600. Valley depth information can be denoted by the image contrast, and average valley width at an average valley depth can be computed to form a face structure map. Such plots and values can be generated and analyzed (i.e., computations performed) across some or all portions of the image. For example, some implementations compute such values across an entire face image, and other implementations only compute such values within predefined and located deterministic micro-structure feature regions. As described above, the various plots and values can be mapped to face locations in accordance with the deterministic macro-structure measurements and locations. In some embodiments, the derived deterministic micro-structure measurements are mapped to deterministic macro-structure locations to establish a 3D map of an entire face or portions of a face.

It can be seen that the chromatic response plots 600 can be used to obtain (e.g., extract, derive, compute, etc.) textural signatures. The pattern of peaks and valleys in the chromatic responses 600 can be indicative of deterministic micro-structures, for example, corresponding to the pores and/or other textural variations of the skin in the respective portions of the respective characteristic sub-images 520. Obtaining and characterizing such a textural signature can support certain features. One such feature is that sensing the presence of such a textural signature clearly indicates that the images object is a 3D object with a pattern of micro-structures. For example, a high-resolution 2D photograph may match deterministic macro-structures of a pre-registered individual. However, such a photograph will not include such micro-structures, and imaging of the photograph will not produce such textural signatures. Notably, such a feature does not rely on pre-registration or matching of any particular textural signature; only that a textural signature is present. For example, an implementation can use deterministic macro-structures for face ID sensing, and can further detect presence of any textural signature to ensure that the imaged object is not a 2D photograph, or a 3D model without texture.

Another use of such textural signatures is to determine whether an obtained textural signature is characteristic of the object being imaged. For example, patterns and/or ranges of measurements of valley depths 620 and valley widths 610 obtained from human face skin images may tend to be relatively consistent across most or all human faces. As such, some embodiments can determine whether a derived textural signature is characteristic of a human face, even without pre-registration or matching of any particular textural signature. Some such embodiments can, for example, use deterministic macro-structures for face ID sensing, and can further detect presence of a characteristic textural signature to indicate that the imaged object is a real human face (i.e., not a 2D photograph, 3D model, or other spoof).

Another use of such textural signatures is to determine whether an obtained textural signature is characteristic of a particular, pre-registered user. For example, particular patterns or measurements of valley depths 620 and valley widths 610 obtained from characteristic sub-images 520 of a user's face are correspond to deterministic micro-structures that are practically unique to the user (e.g., sufficiently unique for use in facial recognition, user authentication, biometric verification, etc.). As such, some embodiments can determine whether a derived textural signature matches a profile (i.e., pre-registered) set of textural signatures for a user who is purportedly being imaged. In such embodiments, face ID sensing can use both deterministic macro-structures and deterministic micro-structures to support both verification of a user's identify and spoof detection.

While the illustrated plots only show a chromatic response plots for a single chromatic component (i.e., red), chromatic information can yield additional information that can support additional features. In some embodiments, a single narrow-band optical wavelength is used for face ID sensing. For example, a particular wavelength is chosen to yield sharp contrast in the chromatic response across a wide range of skin tones, pigments, and other characteristics. Some embodiments can use light within the visible spectrum. Other embodiments can additionally or alternatively use light outside of the visible spectrum, such as in an infrared (e.g., near-infrared), or other spectrum. In some embodiments, relative and/or absolute depth information can be obtained by comparing chromatic response data across multiple chromatic responses. For example, the imaging system can be focused according to a green chromatic component, and chromatic response plots can be generated for red and blue chromatic components derived from imaging of an object at some distance from the imaging system. Because the lens will tend to have different focal lengths for different chromatic components at different object distances, differences in sharpness indicated by the different chromatic component responses for a particular characteristic sub-image 520 can be indicative of the relative (e.g., or absolute, if calibrated) distance of the deterministic micro-structure feature region corresponding to that characteristic sub-image 520. This depth information can be used for various purposes, such as to help determine the orientation and/or position of the face being images, to help find one or more absolute reference distances, etc.

Some embodiments can be implemented with only relative distance measurements. As described above, some such embodiments can rely on computationally derived measurements, or the like. For example, upon imaging the face, 2D or 3D coordinate locations are recorded for the bottom center-point of the nose (A), the outer-right eye corner (B), and the center point of the chin (C). In such a case, all these coordinate locations may be referenced to some generated image reference coordinate system and may not have any relation to absolute measurements. Still, a reference vertical can be generated according to line AC, a reference horizontal can be generated to intersect perpendicularly with the reference vertical at point A, a reference triangle can be generated as triangle ABC, etc. Without any absolute distance measurements, the location of a deterministic micro-structure feature region can be obtained according to the reference features. As one example, the pre-registered location of a deterministic micro-structure feature region can be defined as the end of a vector that originates at point A in a direction that bisects line BC at some location (D) and extends 1.4-times the distance of AD.

In other embodiments, it can be desirable to obtain one or more absolute measurements. In some such embodiments, calibrated chromatic differentiation can be used to derive at least one absolute depth measurement. In other such embodiments, measurements can be obtained (e.g., at least during registration) in context of a reference measurement guide. For example, the reference measurement guide can be a ruler, a grid, a frame, a barcode, or anything for which the absolute size is known to, or can be obtained by, the imaging system. In some implementations, the reference measurement guide is implemented on a transparent substrate, such as a ruler printed on a transparent sticker. The reference measurement guide can be placed in one or more locations. For example, a subset of the deterministic macro-structures can be defined for registration and calibration, and the reference measurement guide (or multiple reference measurement guides) can be placed in or near those locations during the registration process.

Figure 7:
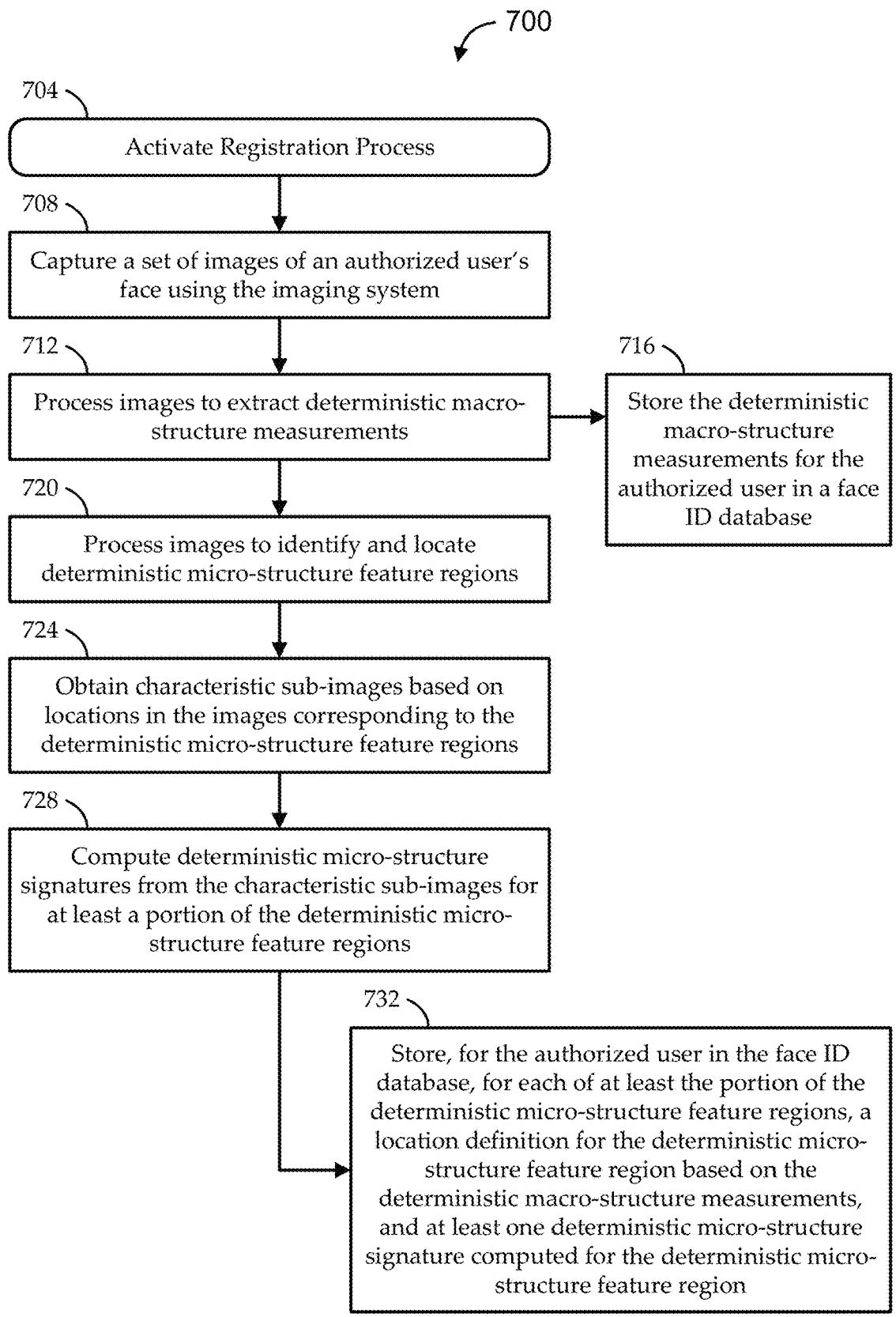
FIG. 7 shows a flow diagram of an illustrative method for registration of a user, according to various embodiments herein.

FIG. 7 shows a flow diagram of an illustrative method 700 for registration of a user, according to various embodiments herein. At stage 704, a face ID registration routine is activated. For example, face ID registration may be activated by an authorized user of a mobile device by selecting face ID registration in "settings," or when the mobile device is turned on by the authorized user for the first time after purchase. At stage 708, the camera may capture a set of images of the authorized user's face. For example, the set of images can include one or more images under one or more imaging conditions, such as using one or more lighting conditions, one or more focus conditions, one or more cameras, one or more aperture or other optical settings, one or more orientations, etc. Similarly, the registration process can prompt the user to capture images of the user at different angles, from different distances, with the head turned in different ways, etc. In some embodiments, capturing the images at stage 708 involves prompting the user to keep eyes focused on one location, or otherwise to position the user's head, eyes, or other features according to specific instructions. In some embodiments, one or more images captured in stage 708 in context of a reference measurement guide, such as a ruler. For example, the user is prompted to place one or more reference measurement guide in the field of view of the imaging system, is a particular location with respect to one or more facial features (e.g., one or more deterministic macro-structures), etc.

At stage 712, embodiments can process the images to extract deterministic macro-structure (DMAS) measurements. For example, image processing techniques can be used to identify large-scale facial features, such as eyes, nose, mouth, etc.; and various deterministic measurements can be obtained from those features, such as eye corner locations, nose width, nose height, eye-to-eye spacing, etc. At stage 716, some or all of the DMAS measurements can be stored in a face ID database in association with the authorized user. For example, the face ID database can store one or more registration profiles for one or more authorized users, and the DMAS measurements can be stored in the registration profile of the authorized user who activated the registration process at stage 704.

At stage 720, embodiments can further process the images to identify and locate deterministic micro-structure (DMIS) feature regions. In some embodiments, image processing techniques are used to identify regions of the face images most likely to include DMIS feature regions, such as relatively large skin areas generally lacking in DMASs or other traceable structures (e.g., skin regions of the cheeks, forehead, nose, etc.). Such embodiments can then determine a location definition for each identified region based on DMAS measurement locations. As described above, in some implementations, the location definition is an algorithm that locates the corresponding DMIS feature region based on a set of references (e.g., reference lines, reference polygons, etc.) generated from the DMAS measurements. Other implementations can use any other suitable type of location definition. For example, the location definition can indicate a set of coordinates in a reference coordinate plane that can be mathematically transformed (e.g., positioned, oriented, scaled, skewed, etc.) based on the DMAS measurements. In other embodiments, the registration process 700 is pre-programmed with candidate location definitions at which identifiable DMIS feature regions are likely to be found. Such embodiments can then seek to identify DMIS feature regions using those location definitions. As described above, in some implementations, the location definition is an algorithm that locates the corresponding DMIS feature region based on a set of references (e.g., reference lines, reference polygons, etc.) generated from the DMAS measurements. Other implementations can use any other suitable type of location definition. For example, the location definition can indicate a set of coordinates in a reference coordinate plane that can be mathematically transformed (e.g., positioned, oriented, scaled, skewed, etc.) based on the DMAS measurements.

At stage 724, embodiments can obtain characteristic sub-images based on locations in the face images identified in stage 720 as corresponding to DMIS feature regions. At stage 728, embodiments can compute DMIS signatures from the characteristic sub-images for at least a portion of the identified DMIS feature regions. In some embodiments, obtaining the characteristic sub-images at stage 724 comprises extracting a portion of the images captured in stage 708. For example, even though the face images captured in stage 708 may include imaging data for the entire face, sub-image portions of those images may still have enough resolution to support computations of DMIS signatures in stage 728. In other embodiments, one or more additional images is captured to form the characteristics sub-images.

For example, the additional images can be captured with different imaging conditions (e.g., different focus settings, aperture settings, lighting settings, zoom settings, etc.) to optimize sharpness of the imaging data in the characteristic sub-image area. As described above, the computations at stage 728 can include statistical processing, and/or other image processing, to identify DMIS textural signatures in the image data. For example, average peak heights, valley widths, and/or other data can be extracted from chromatic response data to indicate micro-textures of the region, such as due to pore patterns, and the like.

At stage 732, embodiments can store various data obtained in the registration process as further registration profile data for the authorized user in the face ID database. In some embodiments, for each DMIS feature region (of some or all of the DMIS feature regions), the storing at stage 732 includes storing the location definition for the DMIS feature region, and at least one DMIS signature computed for the DMIS feature region. For example, subsequent to completing the registration process 700, a registration profile is stored for an authorized user, and the registration profile includes at least: (a) a set of DMAS measurements; (b) a set of location definitions for DMIS feature regions, at least some defined according to the DMAS measurements; and (c) a set of DMIS signatures computed for the DMIS feature regions.

Figure 8:
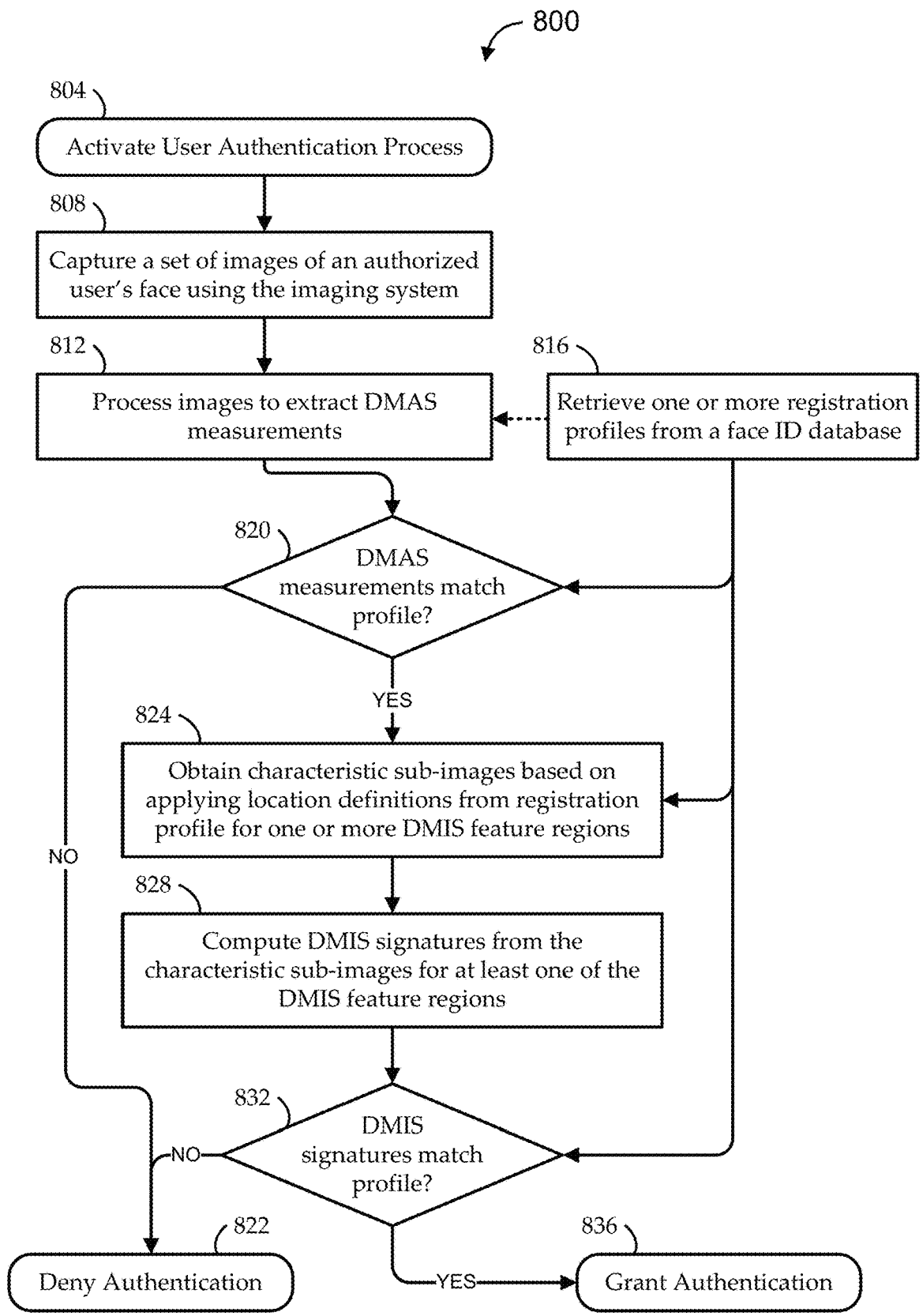
FIG. 8 shows a flow diagram of an illustrative method for authentication of a user, according to various embodiments herein.

FIG. 8 shows a flow diagram of an illustrative method 800 for authentication of a user, according to various embodiments herein. At stage 804, a face ID authentication routine is activated. For example, face ID authentication may be activated by a purportedly authorized user of a mobile device in connection to the user attempting to unlock the phone (from a locked state), to authorize a mobile payment transaction, to authorize user credentials for an application, etc. As described herein, the face ID authentication can be configured for different levels of security, different levels of spoof detection, etc. For example, reducing the number of data points used for face ID authentication, reducing the face ID authentication's reliance on DMIS data, and/or other factors can effectively reduce the security provided by the face ID authentication. To that end, some embodiments can be tuned for increased convenience in exchange for reduced security, for example, by reducing the chance of false negatives (e.g., to reduce frustration of a user repeatedly being unable to access her device), but correspondingly increasing the number of false positives (e.g., potentially authenticating users who are not authorized). Similarly, some embodiments can be tuned for added security, regardless of impacts on convenience. For example, embodiments can be configured to appreciably reduce the chance of false positives by increasing the amount of DMAS and DMIS data used for authentication, even though such an increase can potentially yield more frustrating false negatives, and may increase resource burdens associated with the face ID authentication (e.g., burdens to memory, battery, processor, and/or other resources).

At stage 808, the camera may capture a set of images of the authorized user's face. In some embodiments, the set of images can be collected in substantially the same manner as in stage 708 of the registration process 700. In other embodiments, the image capture at stage 808 involves only a rapid capture of a single, or small number of, image frames. For example, the imaging in stage 708 is more proactive (e.g., collecting multiple images under multiple conditions, with prompts to the user, etc.), while the imaging at stage 808 passively collects what is in the field-of-view of the imaging system. For example, poor image capturing at stage 808 can simply result in a denial of authentication for the user; and embodiments may iterate the method 800 until sufficient image data is captured to make the proper computations, computations, etc. for face ID authentication in accordance with the method 800.

At stage 812, embodiments can process the images to extract deterministic macro-structure (DMAS) measurements. In some embodiments, stage 812 is performed in substantially the same way as stage 712. In other embodiments, stage 812 is performed in a manner that uses profile DMAS measurements as a guide. In some such embodiments, the image(s) from stage 808 may not be captured from optimal angles, or otherwise under optimal conditions. As such, extraction of the DMAS measurements in stage 812 may involve image pre-processing, such as adjusting the lighting, color, scale, skew, contrast, rotation, or other parameters of the image(s). In other such embodiments, the profile DMAS measurements from stage 712 can be used to estimate locations at which DMAS measurements are likely to be found in stage 812.

For example, prior to, concurrent with, or otherwise in connection with the processing in stage 812, one or more registration profiles can be retrieved at stage 816 from a face ID registration database. In some embodiments, activation of the face ID authentication process at stage 804 includes identification of a purported user. For example, a user attempting to be authenticated has already identified herself in some other way, such as by entering a user name, code, password, etc. In such cases, even if multiple authenticated users have registration profiles stored in the database, the method 800 may only need to retrieve and use the one associated with the user seeking authentication. In other embodiments, there may be only a single registration profile stored in the database.

At stage 820, a first authentication stage can be performed in which the DMAS measurements extracted in stage 812 are compared with the profile DMAS measurements from stage 712. If the comparison at stage 820 indicates a match, the process 800 may proceed with further authentication. If the comparison at stage 820 indicates no match, the process 800 may end by denying authentication at stage 822. Different implementations can consider a match in different ways. For example, some implementations can consider the DMAS measurements as being a match when a statistical correlation between the pre-registered dataset and the newly acquired dataset is higher than a predetermined minimum threshold value across the entire dataset. In other implementations, each DMAS measurement, or groupings of DMAS measurements, are evaluated to determine whether each has a high enough statistical correlation with its counterpart data from the registration profile.

In some embodiments, determining whether there is a match at stage 820 can involve additional computations and/or processing, such as applying a three-dimensional transform to one or both datasets, converting from one measurement base to another (e.g., from relative values to absolute values, or vice versa), etc. In some embodiments, the generating the first-level authentication determination at stage 820 is based on comparing an integer number (N) of authentication DMAS measurements (e.g., 20) to N corresponding profile DMAS measurements to determine whether there is at least a threshold magnitude of statistical correlation (e.g., 95%). In some such embodiments, N and/or the threshold magnitude is tunable. For example, a settings portal can be provided by which an authorized user, an administrator, a provider, etc. can adjust the number of DMAS measurement points to collect and/or use, and/or to adjust the threshold correlation value for determining a match.

If a match is determined to exist at stage 820, embodiments of the method 800 can proceed to stage 824. At stage 824, embodiments can obtain characteristic sub-images based on locations in the face images that correspond to DMIS feature regions. For example, as described with reference to the registration method 700, the registration profile can include location definitions for each of multiple DMIS feature regions. Embodiments can apply the location definitions to the images obtained in stage 808 to locate DMIS feature regions, and can obtain characteristic sub-images for those feature regions, accordingly. Some such embodiments locate each DMIS feature region of the one or more DMIS feature regions as a function of applying the authentication DMAS measurements to a respective one of the profile location definitions. Each of the characteristic sub-images can then be obtained by extracting image data corresponding to a defined polygonal region of pixels of the set of images in accordance with the locating. For example, the defined polygonal region of pixels can include a 50-pixel long rectangle, or any suitable region. As in stage 724 of the registration process 700, obtaining the characteristic sub-images at stage 824 can include extracting a portion of the images captured in stage 808, and/or capturing one or more additional images (e.g., under different imaging conditions).

At stage 828, embodiments can compute DMIS signatures from the characteristic sub-images for at least a portion of the identified DMIS feature regions. In some embodiments, the computations of stage 828 are substantially identical to those of stage 728. As described herein, the computations at stage 828 can include statistical processing, and/or other image processing, to identify DMIS textural signatures in the image data. For example, average peak heights, valley widths, and/or other data can be extracted from chromatic response data to indicate micro-textures of the region, such as due to pore patterns, and the like. In some embodiments, the computing at stage 828 includes: generating a chromatic response plot from at least one of the characteristic sub-images corresponding to a respective one of the DMIS feature regions; computing a set of peak/valley data (e.g., peak heights, valley widths, peak spacing, averages of peak and/or valley measurements, etc.) for the respective one of the DMIS feature regions based on statistically processing the chromatic response plot; and analyzing the peak/valley data to obtain the one or more authentication DMIS signatures as indicating a textural signature of the respective one of the DMIS feature regions.

At stage 832, a second authentication stage can be performed in which the DMIS signatures computed in stage 828 are compared with the profile DMIS signatures from stage 728 (and stored as part of the registration profile). In some embodiments, generating the second-level authentication determination at stage 832 can include: determining not to deny authentication for the user when the authentication DMIS signatures match the profile DMIS signatures to at least a threshold statistical correlation level (e.g., 95%); and determining to deny authentication for the user otherwise. If the comparison at stage 832 indicates a match, the process 800 may conclude by authenticating the user at stage 836. If the comparison at stage 832 indicates no match, the process 800 may end by denying authentication at stage 822. In some embodiments, the determination at stage 832 is performed in a similar manner to the determination at stage 820. In other embodiments, different parameters and/or techniques can be used in stage 832 to determine whether there is a match.

Some implementations can be tuned to find a match at stage 820 only when there is a very high statistical correlation with the registration profile data, but a lower threshold is set for the determination at stage 832. For example, such tuning can support a configuration in which the primary face ID authentication is based on the determination at stage 820, and the determination at stage 832 is supplemented for anti-spoofing, and/or as a second verification of the determination at stage 820. Other implementations can be tuned to find a match at stage 820 even with a relatively low statistical correlation with the registration profile data, but will only authenticate a user if there is also a very high correlation with registration profile data at stage 832. For example, such tuning can support a configuration in which the determination at stage 820 is used as a quick initial check (e.g., a very lightweight initial check that can be iterated continuously as part of a lock mode background process, or the like), and the primary face ID authentication is based on the determination at stage 832. Other tunings are possible to support other contexts and features. In some embodiments, generating the first-level authentication determination in stage 820 is based on comparing an integer number (N) of authentication DMAS measurements to N corresponding profile DMAS measurements to determine whether there is at least a first threshold magnitude of statistical correlation; generating the second-level authentication determination at stage 832 is based on comparing an integer number (M) of authentication DMIS signatures to M corresponding profile DMIS signatures to determine whether there is at least a second threshold magnitude of statistical correlation; and at least one of N, M, the first threshold magnitude, or the second threshold magnitude is tunable by an authenticated user. In such embodiments, N and M can be equal or different, and the threshold magnitudes can be the same or different.

Figure 9:
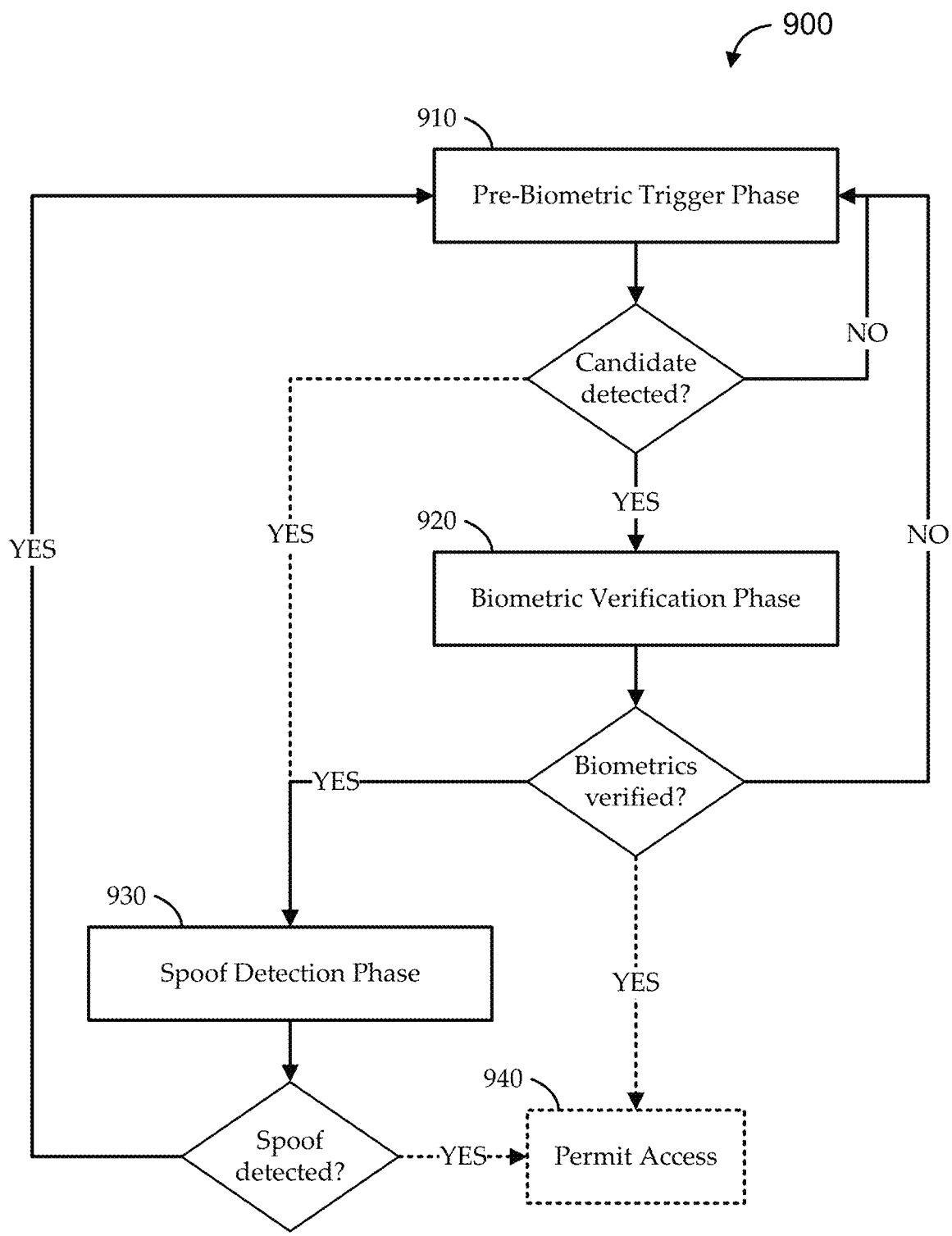
FIG. 9 shows a flow diagram of an example gated process for access control, according to various embodiments.

FIG. 9 shows a flow diagram of an example gated process 900 for access control, according to various embodiments. For example, a user can seek access to a smart phone having an integrated image sensor system, such as described herein. Access to the smart phone is locked until the user successfully passes a biometric verification of the user's face based on previously registered data. Biometric verification (or authentication) generally refers to verifying biometrics of a candidate user (or other object) against corresponding biometrics of a previously registered user. Biometric verification can be much simpler than so-called biometric identification. For example, biometric identification may seek to determine the identity of a candidate user from a general population of users, such as my determining whether a fingerprint matches any of a large database of fingerprints to at least some threshold confidence level; while biometric verification can begin with an assumed set (e.g., one or a relatively small number) of pre-registered users, and can seek to determine whether a current candidate user seems to match one of the assumed set of users to a threshold level of confidence. Biometric access control systems, like those of the example smart phone, are typically based on biometric verification. For example, the smart phone (or similarly, an identification badge, an electronic door lock, etc.) may only be associated with a single authorized user, and the function of the system is to determine whether a candidate user attempting access appears (e.g., statistically) to be the authorized user. Such a function does not require the system to search a huge database in an attempt to identify the candidate user.

In a pre-biometric trigger phase 910, embodiments can wait to detect a candidate image or images, which can trigger further biometric verification. For example, the image sensor can continuously, periodically, or otherwise obtain images. The images can be dynamically processed to detect a set of image data that is generally characteristic of a face, or otherwise of a candidate for biometric verification. For example, certain traceable structures are detected in a particular pattern (e.g., at relative locations, sizes, etc.) that indicate to the system that the captured image is a candidate face image for biometric processing. In some implementations, this phase 910 can use various techniques to improve the detection of such traceable structures. For example, the phase 910 can include focusing the imaging system based on one or more parameters, such as based on a chromatic component; and/or the phase 910 can include analysis of individual chromatic components of the raw image data (e.g., including computing statistical analyses of image brightness plots, etc.); and/or the phase 910 can involve correcting imaging data for parameters, such as contrast, spectrum reflectance, spectrum illumination inequality, surface transmission, etc.

In a biometric verification phase 920, the same and/or different traceable structures are used for biometric verification of the pre-registered user. In some implementations, the imaging data obtained in phase 910 is sufficient for the biometric verification in phase 920. In other implementations, additional and/or different imaging data is obtained, such as high-definition data with multiple chromatic components. In some embodiments, the phase 920 can involve resizing and/or reorienting the obtained data, and/or correcting the data for size and/or orientation. For example, as described above, certain traceable structures have known sizes, certain distances are known between traceable structures, etc. Comparing such known information to the obtained information can provide information as to the distance of the imaged object from the imaging system (e.g., objects appear smaller as they move farther from the imaging system), and/or to the orientation of the imaged object with respect to the imaging system (e.g., when the imaged object is tilted, its set of traceable structures is tilted in a deterministic manner). In some implementations, parameters of the imaging system are also known and can be used in this phase 920. For example, correlations between size and distance can be a function of certain lens parameters, focusing data, etc. As described above, the biometric verification can be based on determining whether the traceable structures (e.g., sizes, locations, separations, shapes, etc.) appear to match those of the registered object. Further as described above, biometric verification in phase 920 can additionally or alternatively be based on textural signatures being characteristic of a registered user. For example, the biometric verification can determine matches between present imaging data and pre-registered imaging data based on some or all of: the set of DMAS measurements; the set of location definitions for DMIS feature regions, at least some defined according to the DMAS measurements; and the set of DMIS signatures computed for the DMIS feature regions.

Some embodiments end with successful passage of the biometric verification phase 920. For example, passing the biometric verification phase 920 triggers output of a verification signal, which triggers an access control system to permit access at phase 940 (e.g., the smart phone unlocks). Other embodiments further include a spoof detection phase 930. For example, successful passage of the biometric verification in phase 920 can trigger a final hurdle of the spoof detection phase 930, which must also be passed prior to permitting access by an access control system at stage 940. As described above, such a spoof detection phase 930 can use information obtained in the biometric verification phase 920, and/or can obtain any suitable information, to determine whether the candidate object is a spoof. For example, DMIS signatures can be indicative of whether or not a purported human face of a user is a real face, or some type of spoof (e.g., a high-resolution 2D photograph, a 3D sculpture of a face in wax or latex, mask prosthetics being worn over a human face, etc.).

Some embodiments may include only one or two of the phases of the flow diagram 900, and the various phases can be performed in any order. In some embodiments, the spoof detection phase 930 and the biometric verification phase 920 are performed sequentially. For example, successful passage of the biometric verification phase 920 triggers a start of the spoof detection phase 930. In other embodiments, the biometric verification phase 920 and the spoof detection phase 930 are performed concurrently (i.e., at least partially in parallel). In some embodiments, some or all phases can be independently triggered. For example, a user can explicitly trigger a biometric verification phase 920, such that the phase 920 is not responsive to successful identification of a candidate in phase 910. Similarly, a user can explicitly trigger a spoof detection phase 930 without an associated biometric verification phase 920. For example, there may be an instance where the user desires to know whether an object is a spoof without determining any type of biometric verification of the object.

Figure 10:
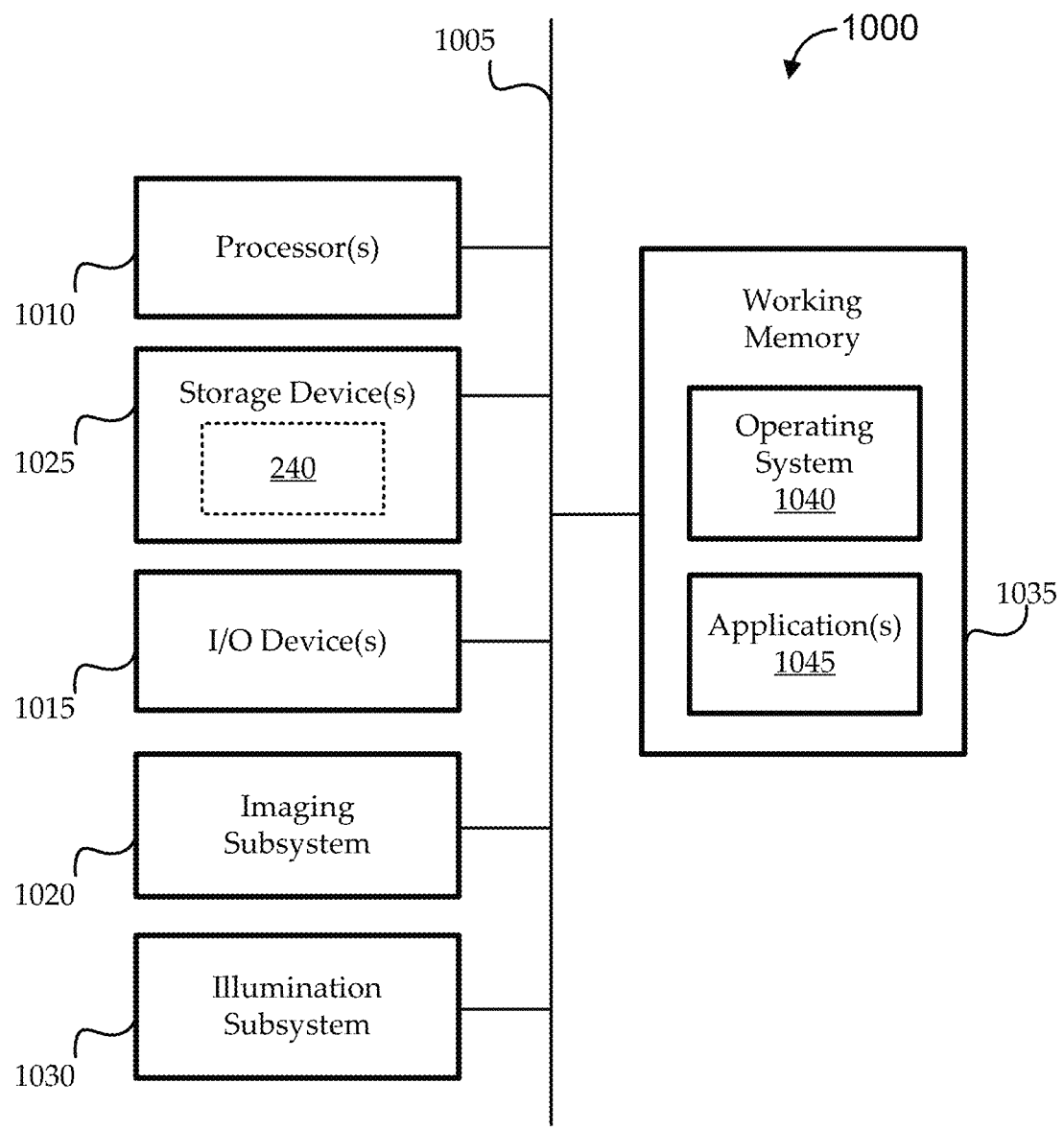
FIG. 10 provides a schematic illustration of one embodiment of a computer system that can implement various system components and/or perform various steps of methods provided by various embodiments.

FIG. 10 provides a schematic illustration of one embodiment of a computer system 1000 that can implement various system components and/or perform various steps of methods provided by various embodiments. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown including hardware elements that can be electrically coupled via a bus 1005 (or may otherwise be in communication, as appropriate). The hardware elements may include one or more processors 1010, including, without limitation, one or more general-purpose processors and/or one or more special-purpose processors (such as digital signal processing chips, graphics acceleration processors, video decoders, and/or the like). For example, processors 1010 can implement control and processing module 230 shown in FIG. 2. Some embodiments include one or more input/output (I/O) devices 1015. In some implementations, the I/O devices 1015 include human-interface devices, such as buttons, switches, keypads, indicators, displays, etc. In other implementations, the I/O devices 1015 include circuit-level devices, such as pins, dip-switches, etc. In some implementations, the computer system 1000 is a server computer configured to interface with additional computers and/or devices, such that the I/O devices 1015 include various physical and/or logical interfaces (e.g., ports, etc.) to facilitate hardware-to-hardware coupling, interaction, control, etc. In some embodiments, the I/O devices 1015 implement output interface 250 of FIG. 2.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the storage devices 1025 include face ID registration database 240 of FIG. 2.

The computer system 1000 can also include, or be in communication with, any other components described herein. In some embodiments, the computer system 1000 includes an imaging subsystem 1020. The imaging subsystem 1020 can include the imaging components 210 of FIG. 2, and/or any other supporting components for imaging, as described herein. In some embodiments, the computer system 1000 includes an illumination subsystem 1030. The illumination subsystem 1030 can include any suitable illumination sources for projecting normal illumination and/or reference illumination into a field of view of the imaging subsystem 1020, and any supporting components. In some such embodiments, the illumination subsystem 1030 includes one or more of illumination sources to provide reference illumination flooding and/or to provide one or more types of probe illumination. Some embodiments can include additional subsystems, such as a communications subsystem (not shown) to communicatively couple with other systems, networks, etc.

Embodiments of the computer system 1000 can further include a working memory 1035, which can include a RAM or ROM device, as described herein. The computer system 1000 also can include software elements, shown as currently being located within the working memory 1035, including an operating system 1040, device drivers, executable libraries, and/or other code, such as one or more application programs 1045, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general purpose computer (or other device) to perform one or more operations in accordance with the described methods. A set of these instructions and/or codes can be stored on a non-transitory computer-readable storage medium, such as the non-transitory storage device(s) 1025 described above. In some cases, the storage medium can be incorporated within a computer system, such as computer system 1000. In other embodiments, the storage medium can be separate from a computer system (e.g., a removable medium, such as a compact disc), and/or provided in an installation package, such that the storage medium can be used to program, configure, and/or adapt a general purpose computer with the instructions/code stored thereon. These instructions can take the form of executable code, which is executable by the computer system 1000 and/or can take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computer system 1000) to perform methods in accordance with various embodiments of the invention. According to a set of embodiments, some or all of the procedures of such methods are performed by the computer system 1000 in response to processor 1010 executing one or more sequences of one or more instructions (which can be incorporated into the operating system 1040 and/or other code, such as an application program 1045) contained in the working memory 1035. Such instructions may be read into the working memory 1035 from another computer-readable medium, such as one or more of the non-transitory storage device(s) 1025. Merely by way of example, execution of the sequences of instructions contained in the working memory 1035 can cause the processor(s) 1010 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 1000, various computer-readable media can be involved in providing instructions/code to processor(s) 1010 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code. Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer can load the instructions into its dynamic memory and send the instructions as signals over a transmission medium to be received and/or executed by the computer system 1000.

It will be understood that, when an element or component is referred to herein as "connected to" or "coupled to" another element or component, it can be connected or coupled to the other element or component, or intervening elements or components may also be present. In contrast, when an element or component is referred to as being "directly connected to," or "directly coupled to" another element or component, there are no intervening elements or components present between them. It will be understood that, although the terms "first," "second," "third," etc. may be used herein to describe various elements, components, these elements, components, regions, should not be limited by these terms. These terms are only used to distinguish one element, component, from another element, component. Thus, a first element, component, discussed below could be termed a second element, component, without departing from the teachings of the present invention. As used herein, the terms "logic low," "low state," "low level," "logic low level," "low," or "0" are used interchangeably. The terms "logic high," "high state," "high level," "logic high level," "high," or "1" are used interchangeably.

As used herein, the terms "a", "an" and "the" may include singular and plural references. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components. Furthermore, as used herein, the words "and/or" may refer to and encompass any possible combinations of one or more of the associated listed items.

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

What is claimed is:

1. A method for authentication of a user based on passive face imaging, the method comprising:
   capturing, by an imaging system, a set of images of a user's face;
   processing the set of images to extract authentication deterministic macro-structure (DMAS) measurements;
   generating a first-level authentication determination based on comparing the authentication DMAS measurements with profile DMAS measurements;
   obtaining one or more characteristic sub-images of one or more deterministic micro-structure (DMIS) feature regions based on profile location definitions for each of the one or more DMIS feature regions;
   computing one or more authentication DMIS signatures from the one or more characteristic sub-images;
   generating a second-level authentication determination based on comparing the authentication DMIS signatures with profile DMIS signatures computed for each of the one or more DMIS feature regions; and
   outputting an authentication result based on both the first-level authentication determination and the second-level authentication that indicates whether authentication of the user is granted or denied.

2. The method of claim 1, further comprising:
   retrieving a registration profile from a face identification database, the registration profile comprising the profile DMAS measurements, the profile location definitions for each of the one or more DMIS feature regions, and the at least one profile DMIS signature computed for each of the one or more DMIS feature regions.

3. The method of claim 1, wherein:
   the first-level authentication determination indicates whether or not to deny authentication of the user; and
   the obtaining, computing, and generating are performed only responsive to the first-level authentication determination indicating not to deny authentication of the user.

4. The method of claim 1, wherein the generating the first-level authentication determination comprises:
   determining a registration measurement base based on the profile DMAS measurements;
   determining an authentication measurement base based on the authentication DMAS measurements;
   applying a mathematical transform so that the profile DMAS measurements and the authentication DMAS measurements are in a shared measurement base; and
   comparing the authentication DMAS measurements with profile DMAS measurements in the shared measurement base.

5. The method of claim 1, wherein the generating the first-level authentication determination comprises:
   determining not to deny authentication for the user when the authentication DMAS measurements match the profile DMAS measurements to at least a threshold statistical correlation level; and
   determining to deny authentication for the user otherwise.

6. The method of claim 1, wherein:
   the generating the first-level authentication determination is based on comparing an integer number (N) of authentication DMAS measurements to N corresponding profile DMAS measurements to determine whether there is at least a threshold magnitude of statistical correlation; and
   N and/or the threshold magnitude is tunable by an authenticated user.

7. The method of claim 1, wherein the obtaining the one or more characteristic sub-images comprises:
   locating each DMIS feature region of the one or more DMIS feature regions as a function of applying the authentication DMAS measurements to a respective one of the profile location definitions; and
   obtaining each of the one or more characteristic sub-images by extracting image data corresponding to a defined polygonal region of pixels of the set of images in accordance with the locating.

8. The method of claim 1, wherein the computing the one or more authentication DMIS signatures from the one or more characteristic sub-images comprises:
   generating a chromatic response plot from at least one of the characteristic sub-images corresponding to a respective one of the DMIS feature regions;
   computing a set of peak/valley data for the respective one of the DMIS feature regions based on statistically processing the chromatic response plot; and analyzing the peak/valley data to obtain the one or more authentication DMIS signatures as indicating a textural signature of the respective one of the DMIS feature regions.

9. The method of claim 1, wherein the generating the second-level authentication determination comprises:
determining not to deny authentication for the user when the authentication DMIS signatures match the profile DMIS signatures to at least a threshold statistical correlation level; and
determining to deny authentication for the user otherwise.

10. The method of claim 1, wherein:
the generating the first-level authentication determination is based on comparing an integer number (N) of authentication DMAS measurements to N corresponding profile DMAS measurements to determine whether there is at least a first threshold magnitude of statistical correlation;
the generating the second-level authentication determination is based on comparing an integer number (M) of authentication DMIS signatures to M corresponding profile DMIS signatures to determine whether there is at least a second threshold magnitude of statistical correlation; and
at least one of N, M, the first threshold magnitude, or the second threshold magnitude is tunable by an authenticated user.

11. A system for authentication of a user based on passive face imaging, the system comprising:
an imaging camera to capture a set of images of a user's face;
a face identification database having, stored thereon, a registration profile comprising profile deterministic macro-structure (DMAS) measurements, profile location definitions for each of one or more deterministic micro-structure (DMIS) feature regions, and at least one profile DMIS signature computed for each of the one or more DMIS feature regions; and
a control and processing module having one or more processors, and a memory having, stored thereon, a set of instructions which, when executed, cause the one or more processors, operating in a user authentication mode, to:
process the set of images to extract authentication DMAS measurements;
generate a first-level authentication determination based on comparing the authentication DMAS measurements with the profile DMAS measurements;
obtain one or more characteristic sub-images of the one or more DMIS feature regions based on the profile location definitions for each of the one or more DMIS feature regions;
compute one or more authentication DMIS signatures from the one or more characteristic sub-images;
generate a second-level authentication determination based on comparing the authentication DMIS signatures with the profile DMIS signatures; and
output an authentication result based on both the first-level authentication determination and the second-level authentication that indicates whether authentication of the user is granted or denied.

12. The system of claim 11, wherein the set of instructions, when executed, cause the one or more processors further, operating in a registration mode, to:
direct capturing, by the imaging camera, of a set of profile images of an authorized user's face;
process the set of profile images to extract the profile DMAS measurements and to identify the one or more profile DMIS feature regions;
for each profile DMIS feature region of the one or more profile DMIS feature regions:
generate a respective profile location definition based on the profile DMAS measurements;
obtain one or more respective characteristic profile sub-images from image data of the profile DMIS feature region; and
computing one or more respective profile DMIS signatures from the one or more respective characteristic profile sub-images; and
storing, as a registration profile for the authorized user in the face identification database, at least some of the profile DMAS measurements, at least some of the respective profile location definitions for the profile DMIS feature regions, and at least some of the profile DMIS signatures computed for the profile DMIS feature regions.

13. The system of claim 11, wherein:
the first-level authentication determination indicates whether or not to deny authentication of the user; and
the set of instructions, when executed, cause the one or more processors to obtain the one or more characteristic sub-images, to compute the one or more authentication DMIS signatures, and to generate the second-level authentication only responsive to the first-level authentication determination indicating not to deny authentication of the user.

14. The system of claim 11, wherein the set of instructions, when executed, cause the one or more processors to generate the first-level authentication determination by:
determining a registration measurement base based on the profile DMAS measurements;
determining an authentication measurement base based on the authentication DMAS measurements;
applying a mathematical transform so that the profile DMAS measurements and the authentication DMAS measurements are in a shared measurement base; and
comparing the authentication DMAS measurements with profile DMAS measurements in the shared measurement base.

15. The system of claim 11, wherein the set of instructions, when executed, cause the one or more processors to generate the first-level authentication determination by:
determining not to deny authentication for the user when the authentication DMAS measurements match the profile DMAS measurements to at least a threshold statistical correlation level; and
determining to deny authentication for the user otherwise.

16. The system of claim 11, wherein the set of instructions, when executed, cause the one or more processors to obtain the one or more characteristic sub-images by:
locating each DMIS feature region of the one or more DMIS feature regions as a function of applying the authentication DMAS measurements to a respective one of the profile location definitions; and
obtaining each of the one or more characteristic sub-images by extracting image data corresponding to a defined polygonal region of pixels of the set of images in accordance with the locating.

17. The system of claim 11, wherein the set of instructions, when executed, cause the one or more processors to compute the one or more authentication DMIS signatures from the one or more characteristic sub-images by:

generating a chromatic response plot from at least one of the characteristic sub-images corresponding to a respective one of the DMIS feature regions;

computing a set of peak/valley data for the respective one of the DMIS feature regions based on statistically processing the chromatic response plot; and analyzing the peak/valley data to obtain the one or more authentication DMIS signatures as indicating a textural signature of the respective one of the DMIS feature regions.

18. The system of claim 11, wherein the set of instructions, when executed, cause the one or more processors to generate the second-level authentication determination by:

determining not to deny authentication for the user when the authentication DMIS signatures match the profile DMIS signatures to at least a threshold statistical correlation level; and determining to deny authentication for the user otherwise.

19. The system of claim 11, wherein:

the set of instructions, when executed, cause the one or more processors to generate the first-level authentication determination is based on comparing an integer number (N) of authentication DMAS measurements to N corresponding profile DMAS measurements to determine whether there is at least a first threshold magnitude of statistical correlation;

the set of instructions, when executed, cause the one or more processors to generate the second-level authentication determination is based on comparing an integer number (M) of authentication DMIS signatures to M corresponding profile DMIS signatures to determine whether there is at least a second threshold magnitude of statistical correlation; and at least one of N, M, the first threshold magnitude, or the second threshold magnitude is tunable by an authenticated user.

20. The system of claim 11, further comprising:

an electronic access control system having the imaging camera, the control and processing module, and the face identification database integrated therein, wherein the electronic access control system is configured to permit or deny access to a physical or electronic resource based on the authentication result.

\* \* \* \* \*